(12) United States Patent
Chen et al.

(10) Patent No.: US 9,637,646 B2
(45) Date of Patent: May 2, 2017

(54) CONDUCTIVE COATING COMPOSITIONS

(71) Applicant: ETERNAL CHEMICAL CO., LTD., Kaohsiung (TW)

(72) Inventors: Wei-Kai Chen, Kaohsiung (TW); Tu-Yi Wu, Kaohsiung (TW); Chung-Jen Chang, Kaohsiung (TW); Meng-Tso Chen, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 13/858,969

(22) Filed: Apr. 9, 2013

(65) Prior Publication Data
US 2013/0284982 A1    Oct. 31, 2013

(30) Foreign Application Priority Data

Apr. 30, 2012 (TW) .............................. 101115406 A

(51) Int. Cl.
*C09D 5/24*    (2006.01)
*H01B 5/14*    (2006.01)
*H01B 1/12*    (2006.01)

(52) U.S. Cl.
CPC ...................... *C09D 5/24* (2013.01)

(58) Field of Classification Search
CPC .......... C09D 5/24; C09D 7/12; C09D 165/00; C09D 179/02; C09D 179/04;
(Continued)

(56) References Cited

U.S. PATENT DOCUMENTS 5,213,714 A    5/1993    Kampf et al.
5,494,609 A *  2/1996    Kulkarni et al. ............. 252/500
(Continued)

FOREIGN PATENT DOCUMENTS

CN    1035315 A    9/1989
CN    101643549 A   2/2010
(Continued)

OTHER PUBLICATIONS

Heraeus. Issue Mar. 2012. "Coating Guide Clevios P Formulations". p. 1 Paragraph 2.*
(Continued)

*Primary Examiner* — Harold Pyon
*Assistant Examiner* — Danny N Kang
(74) *Attorney, Agent, or Firm* — Ladas & Parry LLP

(57) ABSTRACT

The present invention provides a conductive coating composition, which contains: a conductive organic polymer, a non-conductive organic compound, a solvent and optionally a curing agent; where the content of the conductive organic polymer is about 10% to about 50%, based on the total weight of the solids content in the composition. The present invention also provides a conductive film, which is formed by drying the conductive coating composition. The conductive film has a surface resistivity lower than 1000 Ω/sq and a total light transmittance greater than 80%. The conductive coating composition of the present invention can be used as an electromagnetic interference shielding material or an electrode material, and can be applied to various electronic products.

8 Claims, 1 Drawing Sheet

(58) Field of Classification Search
CPC .. C09D 167/00; C09D 183/04; C09D 163/00;
H01B 5/14; H01B 1/12
USPC .................................................. 252/478–500
See application file for complete search history.

(56) References Cited

U.S. PATENT DOCUMENTS

| | | | |
|---|---|---|---|
| 6,429,248 B2 * | 8/2002 | Schwark et al. .............. | 524/315 |
| 7,393,474 B2 * | 7/2008 | Park et al. .................... | 252/500 |
| 2004/0258952 A1 * | 12/2004 | Haghighat et al. .......... | 428/690 |
| 2010/0252782 A1 | 10/2010 | Masahiro | |

FOREIGN PATENT DOCUMENTS

| | | |
|---|---|---|
| TW | 200927860 | 7/2009 |
| TW | 201035996 A1 | 10/2010 |
| TW | 201042661 A1 | 12/2010 |
| TW | 1353471 B | 12/2011 |

OTHER PUBLICATIONS

Office Action dated Apr. 17, 2014 for Chinese Application No. 201210392679.4.
Office Action dated Dec. 6, 2013 for Taiwan Application No. 101115406 with English translation.
Espacenet English abstract of TW 201042661 A1.
Espacenet English abstract of CN 101643549 A.
Espacenet English abstract of TW 201035996 A1.
Espacenet English abstract of TW 1353471 B.

* cited by examiner

CONDUCTIVE COATING COMPOSITIONS

BACKGROUND OF THE INVENTION

1. Field of the Invention

The present invention relates to a conductive coating composition, which can be coated on a substrate to enable the surface of the substrate to have an electromagnetic wave shielding effect. The present invention also relates to a conductive film formed by the conductive coating composition.

2. Description of the Prior Art

In operation of an electronic device, a certain degree of electromagnetic field is generated, and electromagnetic fields generated by devices may interfere with each other or block each other, or normal operation of neighboring devices is affected. Therefore, if the electromagnetic fields generated by a circuit current are not shielded appropriately, the electromagnetic fields may interfere with each other, and is the quality of signal transmission is deteriorated, so that the devices cannot be operated normally.

As a manner for electronic devices to resist electromagnetic interference, an electromagnetic interference (EMI) shielding material is used as a shielding cover for resisting the electromagnetic interference. The principle of the electromagnetic interference shielding is to adopt a low-resistance (surface resistivity lower than $10^5$ Ω/sq) conductive material, because the conductive material has a reflection and guiding effect on electromagnetic waves. According to the theory of electromagnetic wave shielding of metal materials, the electromagnetic shielding effect of the metal material is the sum of the reflection loss of the electromagnetic wave, the absorption loss of the electromagnetic wave and the loss of the electromagnetic wave in the shielding material.

Most commonly, a complete metal protection net formed by a conductive tape or conductive gasket is adopted, so that the electronic circuit is in a completely isolated space without being interfered by external electromagnetic waves or interfering with other electronic components. The commercially available products include: an aluminum tape, a copper foil tape, an EMI conductive tape, an EMI gasket, a becu finger, a double-sided tape and so on, and moreover, the products have the advantages of simple operation and being easy to be torn and pasted, and are widely used in LCD TVs, laptops, mobile phones, computers and so on.

In the field of touch displays, in order to avoid influence on the normal display function caused by mutual interference between electromagnetic fields of the display and the touch panel, an electromagnetic wave shielding material is generally added between the display and the touch panel. As shown in a schematic view in FIG. 1, a touch display generally includes a touch panel (10), an electromagnetic interference shielding material (11) and a display (12), where the electromagnetic interference shielding material is located between the touch panel and the display. Because the touch panel is disposed in front of the display, the electromagnetic wave shielding material needs to have a high total light transmittance. In the art, indium tin oxide (ITO) is usually used as an electromagnetic interference shielding material, which is a transparent conductive material. However, this material is expensive, and needs to be fabricated through sputtering or deposition in vacuum, resulting in a high production cost. In addition, the ITO material is not flexible, so the application in some electronic products is limited.

Taiwan Patent No. 1353471 discloses that a metal net is used as an electromagnetic interference shielding material for a touch display, and the metal net is fabricated by weaving metal wires having a width that does not influence the vision of naked eyes and having the electromagnetic shielding effect. However, this material needs to be prepared through a photolithography process, and the process is expensive.

In addition, in Taiwan Patent Publication No. TW 201035996, a carbon nanotube is used as an electromagnetic interference shielding material of a touch display. However, synthesis of the carbon nanotube is complex, and the cost is high. Further, the carbon nanotube has a black appearance, and cannot be coated on the whole surface without influence on the light transmittance, so the electromagnetic shielding effect is limited.

Therefore, it is an object expected by the industry nowadays to find a flexible and chemical-resistant transparent material that can effectively isolate electromagnetic waves, has a low cost, and can be applied to various electronic products.

SUMMARY OF THE INVENTION

Accordingly, the present invention provides a conductive coating composition for solving the foregoing problems. Specifically, the conductive coating composition of the present invention can be used to prepare an electromagnetic interference shielding material, which can effectively overcome the defects and limitation of the materials mentioned in the prior art, and have the advantages of low surface resistivity, high total light transmittance, flexibility, stability and chemical resistance and so on. In addition, it has a very low production cost, and the electromagnetic interference shielding material is applicable to various electronic devices. Furthermore, the conductive coating composition of the present invention is coated on a substrate in a common coating manner for use, and the manufacturing process is simpler and cheaper, as compared with the prior art.

The present invention is mainly directed to a conductive coating composition, which comprises a conductive organic polymer, a non-conductive organic compound, a solvent and optionally a curing agent. The content of the conductive organic polymer is about 10% to 50%, based on the total weight of the solids content.

The present invention is further directed to a conductive film, which comprises: a substrate and a conductive layer. The conductive layer is obtained by drying and curing the conductive coating composition, and the conductive film has a surface resistivity lower than 1000 Ω/sq and a total light transmittance greater than 80%.

BRIEF DESCRIPTION OF THE DRAWINGS

The invention will be described according to the appended drawings in which.

DETAILED DESCRIPTION

Figure 1:
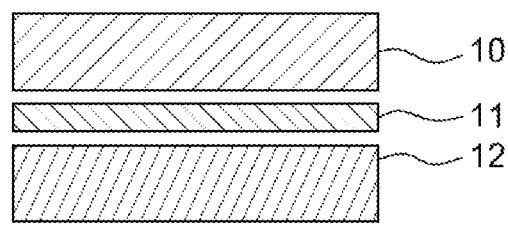
FIG. 1 is a schematic view of the position of an electromagnetic interference shielding material in a touch display.

The conductive organic polymer used in the composition of the present invention is selected from the group consisting of: a polythiophene compound, a polyaniline compound, a polypyrrole compound and a combination thereof, with a polythiophene compound being preferred. The polythiophene compound is poly(3-hexylthiophene), poly(3,4-ethylenedioxythiophene) (PEDOT), a poly(3,4-ethylenedioxythiophene) derivative doped with a polyanion (such as poly(3,4-ethylenedioxythiophene: polystyrene sulfonic acid (PEDOT: PSS)) or poly(3,4-ethylenedioxythiophene: polyvinyl sulfonic acid (PEDOT: PVS)) or a combination thereof.

According to the present invention, the content of the conductive organic polymer is about 10 wt % to about 50 wt %, and preferably about 25 wt % to about 45 wt %, based on the total weight of the solids content in the composition.

An example of a commercially available polythiophene compound includes CLEVIOS P™, CLEVIOS PH500™, CLEVIOS PH1000™, CLEVIOS P HCV4$^{198}$ (manufactured by Heraeus Holding GmbH) or ORGACON ICP 1050™ (manufactured by Agfa Company); an example of a commercially available polyaniline compound includes 650013 (manufactured by Aldrich Company); an example of a commercially available polypyrrole compound includes 482552 (manufactured by Aldrich Company).

The non-conductive organic compound used in the composition of the present invention generally is a monomer, an oligomer, a polymer or a combination thereof, and is mainly used as a binder to assist the conductive organic polymer to disperse uniformly and then to form a film. The non-conductive organic compound is selected from the group consisting of: a polyester resin, an epoxy resin, a polyurethane resin, a polyacrylate resin, a silicone resin, a polyether polyol resin, a polyol resin and a combination thereof; and preferably, selected from the group consisting of a polyester resin, a polyacrylate resin, a silicone resin or a polyol resin.

According to the present invention, the content of the non-conductive organic compound is about 10 wt % to about 90 wt %, and preferably about 15 wt % to about 75 wt %, based on the total weight of the solids content in the composition.

The weight-average molecular weight of a polymer of the non-conductive organic compound of the present invention is in the range of 7,000 to 25,000, and preferably in the range of 10,000 to 20,000.

An example of a commercially available polyester includes ETERKYD 5032-W25, ETERKYD 5035-W33 or ETERKYD 5036-W33 (manufactured by Eternal Chemical Co., Ltd.); an example of a commercially available epoxy resin includes 1030CP (manufactured by Rainbow Company) or EPR-401 (manufactured by Chingtai Resins Chemical Co. Ltd.); and an example of a commercially available polyurethane includes ETERCURE DR-W401, ETERCURE DR-W402 or ETERCURE DR-W403 (manufactured by Eternal Chemical Co., Ltd.) or L-3935 (manufactured by Chan Sieh Enterprises Co., Ltd.); an example of a commercially available polyacrylate includes CN 2716, CN2717, CN132 or SB500K60 and so on (manufactured by Sartomer Company), P-60 (manufactured by Chan Sieh Enterprises Co., Ltd.) or ETERSOL 1122-2B (manufactured by Eternal Chemical Co., Ltd.).

A solvent used in the composition of the present invention is preferably a polar solvent, for example, but not limited to, water, alcohols, alcohol ethers, ketones or a combination thereof.

An alcohol solvent useful in the present invention includes, for example, but is not limited to, methanol, ethanol, ethylene glycol, propanol, isopropanol, n-butanol, tert-butanol, isopentanol or a mixture thereof.

An alcohol ether solvent useful in the present invention includes, for example, but is not limited to, ethylene glycol monobutyl ether (BCS), ethylene glycol ethyl ether acetate (CAC), ethylene glycol monoethyl ether (ECS), propylene glycol monomethyl ether, propylene glycol monomethyl ether acetate (PMA), propylene glycol monomethyl ether propionate (PMP), butylene glycol monomethyl ether (DBE) or a mixture thereof.

A ketone solvent useful in the present invention includes, for example, but is not limited to, methyl ethyl ketone (MEK), acetone, methyl isobutyl ketone, cyclohexanone, 4-hydroxy-4-methyl-2-pentanone or a mixture thereof.

A polar solvent useful in the present invention may be an aprotic solvent, for example, but not limited to, N-methylpyrrolidone (NMP), dimethylacetamide (DMAC), dimethylformamide (DMF), dimethyl sulfoxide (DMSO), tetrahydrofuran (THF), toluene, xylene or a mixture thereof.

According to the present invention, the content of the solvent is about 80 wt % to about 99.5 wt %, preferably about 90 wt % to 99 wt %, and more preferably about 95 wt % to 99 wt %, based on the total weight of the composition.

In order to form crosslinking through a chemical bonding formed between molecules, optionally, the composition of the present invention may further comprise a curing agent. The curing agent is well known to those skilled in the art, and for example, may be selected from the group consisting of: a melamine curing agent, an isocyanate curing agent and an epoxy curing agent, with a melamine curing agent or an isocyanate curing agent being preferred. The melamine curing agent of the present invention includes, for example, but is not limited to, melamine or an etherified melamine derivative; the isocyanate curing agent of the present invention includes, for example, but is not limited to, diisocyanate or polyisocyanate.

According to the present invention, the content of the curing agent is about 0 wt % to about 60 wt %, preferably about 20 wt % to about 50 wt %, and more preferably about 30 wt % to about 40 wt %, based on the total weight of the solids content in the composition of the present invention.

Furthermore, optionally, other additives may be added to obtain intended properties of the conductive coating composition. The additive useful in the present invention may be, for example, but not limited to, selected from the group consisting of: a dispersing agent, a leveling agent, a wetting agent, a stabilizing agent, an adhesion promoter, an ultraviolet absorber and a mixture thereof.

The dispersing agent useful in the present invention may be selected from ionic or nonionic organic surfactants containing an unsaturated polyamic acid, amine, or a high-molecular-weight unsaturated polycarboxylic acid. In addition, if exists, the content of the dispersing agent is about 1% to about 15%, and preferably about 3% to about 10%, based on the total weight of the solids content in the composition.

In addition, during the element manufacturing process, an ultraviolet irradiation process may be needed. However, the structure of a π bond of the conductive organic polymer may be damaged due to the ultraviolet irradiation, resulting in decrease of the conductivity and the light transmittance. Furthermore, when a plastic substrate is used, the plastic substrate may be yellowed due to the ultraviolet irradiation. In order to avoid the problems that the conductivity and the light transmittance are decreased and the plastic substrate is yellowed, an ultraviolet absorber or an inorganic particle capable of absorbing the ultraviolet light or a combination thereof may be added optionally. The ultraviolet absorber useful in the present invention is well known to those of ordinary skill in the art of the present invention, and may be, for example, benzotriazoles, benzotriazines, benzophenones, salicylic acid derivatives.

The inorganic particle capable of absorbing the ultraviolet light useful in the present invention is well known to those of ordinary skill in the art of the present invention and includes, for example, but is not limited to, zinc oxide, zirconium oxide, aluminum oxide, strontium titanate, titanium dioxide or a mixture thereof, with titanium dioxide, zirconium oxide, aluminum oxide, zinc oxide or a mixture thereof being preferred. The particle size of the inorganic particle is generally about 1 to about 100 nanometer (nm), and preferably about 20 nm to about 50 nm.

In addition, if exists, the content of the ultraviolet absorber and/or the inorganic particle is about 1% to 10%, and preferably about 3% to about 8%, based on the total weight of the solids content in the composition.

According to a preferred specific embodiment of the present invention, a method for manufacturing a conductive coating composition of the present invention includes the following steps:

(a) mixing a conductive organic polymer, a non-conductive organic compound, optionally a dispersing agent and a solvent, and shaking uniformly with a high-power dispersing device such as an ultrasonic vibrator to form a uniformly mixture; and (b) adding a curing agent and optionally other additives to the composition obtained in Step (a), and mixing and stirring uniformly.

The selection of the components such as the conductive organic polymer, the non-conductive organic polymer, the solvent and the additive mentioned in the steps is as the foregoing description.

The present invention further provides a conductive film, which comprises a substrate. At least one surface of the substrate has a is conductive layer. The conductive layer is obtained by drying and curing the conductive coating composition of the present invention. The conductive film of the present invention has a surface resistivity lower than 1000 Ω/sq (Ω/sq represents ohm/square meter) and a total light transmittance greater than 80%, and preferably a surface resistivity lower than 400 Ω/sq and a total light transmittance greater than 85%.

The substrate of the conductive film of the present invention is not specifically limited in selection, and is well known to those of ordinary skill in the art and depends on the design of the electronic products to which the conductive film is applied. The substrate includes, for example, but is not limited to, glass, metal, plastics, carbon fiber, glass fiber or a composite material formed thereby.

The plastic substrate useful in the present invention includes, for example, but is not limited to, a polyester resin such as polyethylene terephthalate (PET) or polyethylene naphthalate (PEN); a polyacrylate resin such as polymethyl methacrylate (PMMA); a polyolefin resin such as polyethylene (PE) or polypropylene (PP); a polycycloolefin resin; a polyamide resin such as nylon 6, nylon 66 or MXD nylon (m-xylxylene diamine/adipic acid copolymer); a polyimide resin; a polycarbonate resin; a polyurethane resin; polyvinyl chloride (PVC); triacetyl cellulose (TAC); polylactic acid; or an olefin polymer having a substituent, such as polyvinyl acetate or polyvinyl alcohol. The plastic substrate is preferably a polyester resin, a polyacrylate resin, a polyimide resin, a polycarbonate resin or a combination thereof, and more preferably polyethylene terephthalate, polymethyl methacrylate, a polyimide resin or a polycarbonate resin. The thickness of the substrate is not specifically limited, and generally depends on the requirement of the intended products, and is generally about 15 µm to about 300 µm.

For example, the conductive coating composition of the present invention may be applied on at least one surface of the substrate to form at least one coating, which is then heated and dried to form a conductive layer. According to an embodiment of the present invention, the conductive coating composition of the present invention is applied to a plastic substrate or a glass substrate. According to another embodiment of the present invention, an electronic component may be used as the substrate, and the conductive coating composition of the present invention may be directly applied to the electronic element. According to another embodiment of the present invention, the conductive coating composition is applied to the touch panel. The applying method may be those well known to persons having ordinary skill in the art, for example, coating, spray, screen printing, printing or dipping.

The coating method includes, for example, but is not limited to, knife coating, roller coating, flexographic coating, thermal transfer coating, micro gravure coating, flow coating, curtain coating, spin coating, spray coating, bar coating, slot die coating, gravure coating, slide coating or other conventional methods or a combination thereof.

The printing method includes, for example, but is not limited to, gravure printing, micro gravure printing, letterpress printing, ink-jet printing or a combination thereof.

When the conductive coating composition of the present invention is used to prepare a conductive film, a coating of about 5 µm to about 30 µm can be coated, which is then dried and cured to form a homogeneous conductive layer of about 100 to about 600 nanometer, and preferably about 150 to about 400 nanometer.

According a preferred specific embodiment of the present invention, a method for manufacturing a conductive film of the present invention includes the following steps:

(I) coating the conductive coating composition of the present invention on a glass or plastic substrate, where the thickness of the coating is about 5 µm to about 30 µm; and (II) drying and curing the coating by heating, to form a conductive layer.

If necessary, the foregoing steps can be repeated to obtain a plurality of conductive layers.

The heating condition of Step (II) is not specifically limited, and may be well known to persons having ordinary skill in the art, for example, heating at a temperature of about 100° C. to about 150° C. for about 30 seconds to about 10 minutes.

In addition, in case of ultraviolet irradiation or in an oxygen environment at a temperature higher than 70° C., the conductive organic polymer may be oxidized, so that the conductivity of the conductive film is decreased. In order to isolate the conductive layer from oxygen to maintain a good conductivity for a long time, a protective layer may be optionally coated on the surface of conductive layer of the conductive film of the present invention, or a stable layer is formed on the conductive layer of the conductive film by using a coating method, so as to prevent the conductive organic polymer from being oxidized. The coating method is as the foregoing description.

The conductive film of the present invention has a fine conductivity and light transmittance effect, a good adhesion with the substrate and a good chemical resistance, and can be used as an EMI shielding material, a conductive material, a hole transfer layer material or an electrode material, and especially as an EMI shielding material. The electromagnetic interference shielding effect refers to the sum of the reflection loss of the is electromagnetic wave, the absorption loss of the electromagnetic wave and the loss of the electromagnetic wave in the shielding material. Generally, the conductive film of the present invention is a low-resistance conductive material, has a reflection and guiding effect on the electromagnetic wave, and has an excellent conductivity, thus having a good EMI shielding effect. According to a specific embodiment of the present invention, the conductive film of the present invention can replace the conventional ITO or metal net and be used as the electromagnetic interference shielding material of a touch panel.

The present invention further provides an anti-electromagnetic interference touch panel, which includes a transparent substrate and an anti-electromagnetic interference layer. The anti-electromagnetic interference layer of the present invention may be formed by laminating a conductive film of the present invention on a surface of a transparent substrate with an adhesion layer. According to an embodiment of the present invention, the adhesion layer is formed by an optically clear adhesive. The anti-electromagnetic interference layer of the present invention may also be obtained by applying the conductive coating composition of the present invention to a surface of a transparent substrate, and curing through heating or irradiation. The transparent substrate includes at least one sensing circuit layer on the other surface opposite to the anti-electromagnetic interference layer. The material of the sensing circuit layer may be those well known to persons having ordinary skill in the art, for example, ITO. The transparent substrate may be those well known to persons having ordinary skill in the art, for example, a glass or plastic substrate. The plastic substrate is not specifically limited, and preferably has a high transparency and is scratch resistant. The thickness of the transparent substrate generally depends on the requirement of the intended optical products, and is preferably in the range of about 25 μm and about 2000 μm.

Figure 2:
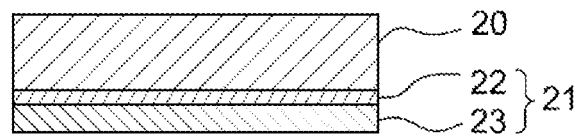
FIG. 2 is a schematic view of a touch panel with an electromagnetic interference shielding material.
Figure 3:
FIG. 3 is a schematic view of a touch panel with an electromagnetic interference shielding material.

FIG. 2 and FIG. 3 are respectively an embodiment of the anti-electromagnetic interference touch panel. FIG. 2 is an anti-electromagnetic interference touch panel. As shown in FIG. 2, the anti-electromagnetic interference touch panel comprises:

a transparent substrate (20); and an anti-electromagnetic interference layer (21);

where the anti-electromagnetic interference layer is formed by laminating a conductive film (23) of the present invention on a surface of a transparent substrate with an adhesion layer (22).

FIG. 3 is also an anti-electromagnetic touch panel. As shown in FIG. 3, the anti-electromagnetic touch panel comprises:

a transparent substrate (30); and an anti-electromagnetic interference layer (31);

where the anti-electromagnetic interference layer is obtained by drying and curing the conductive coating composition of the present invention.

The touch panel of the present invention can be laminated to a display by a method well known to persons having ordinary skill in the art, so as to form a touch display.

The present invention will be further described in detail with specific examples. It should be understood that the examples are merely used to exemplify the present invention, but not intended to limit the scope of the present invention. Any modification and variation easily made by those of ordinary skill in the art should fall within the scope of the content disclosed in the specification and the following claims of the present invention.

EXAMPLES

Examples 1 to 10 and Comparative Examples 1 to 2

The liquid adhesives of conductive coating compositions of Examples 1 to 10 and Comparative Examples 1 to 2 were prepared in the following manner, and the components thereof were listed in Table 1.

First, components (a), (b), (c), (d), and (f) were mixed with a solvent in an amount of weight content (%) of the solids content listed in Table 1, and the mixture were shaken by an ultrasonic vibrator for 10 minutes. Next, the solution was added with components (e), (g), and (h), stirred and mixed uniformly, and diluted with a solvent to the content of the solids content being 2 wt %, based on the weight of the conductive coating composition. The solvent was formulated by water, isopropanol, ethylene glycol and dimethyl sulfoxide at a weight ratio of 15:1:1:1.

TABLE 1

| | Component | | | | | | | |
|---|---|---|---|---|---|---|---|---|
| | Conductive organic polymer | Non-conductive organic compound | | | Curing agent | Additive | | |
| Example | a | b | c | d | e | f | g | h |
| Example 1 | 10.01 | 31.41 | — | — | 50.21 | 8.37 | — | — |
| Example 2 | 18.25 | 28.52 | — | — | 45.63 | 7.60 | — | — |
| Example 3 | 30.87 | 24.11 | — | — | 38.59 | 6.43 | — | — |
| Example 4 | 40.11 | 20.89 | — | — | 33.43 | 5.57 | — | — |
| Example 5 | 47.17 | 18.44 | — | — | 29.48 | 4.91 | — | — |
| Example 6 | 40.11 | — | 20.89 | — | 33.43 | 5.57 | — | — |
| Example 7 | 37.99 | 19.79 | — | — | 31.66 | 5.28 | 5.28 | — |
| Example 8 | 37.99 | 19.79 | — | — | 31.66 | 5.28 | — | 5.28 |
| Example 9 | 31.03 | — | — | 64.66 | — | 4.31 | — | — |
| Example 10 | 26.72 | 13.91 | — | 55.66 | — | 3.71 | — | — |
| Comparative Example 1 | 5.29 | 33.04 | — | — | 52.86 | 8.37 | — | — |
| Comparative Example 2 | 52.75 | 16.48 | — | — | 26.37 | 4.40 | — | — |

(a): Conductive organic polymer (Clevios PH1000, manufactured by Heraeus Holding GmbH)
(b): Polyester resin (ETERKYD 5035-W-33, manufactured by Eternal Chemical Co., Ltd.)
(c): Polyol (G140; manufactured by Sino-Japan Chemical Co., Ltd.)
(d): Silicone resin: 3-glycidoxypropyltrimethoxysilane (KBM-403; manufactured by Topco Company)
(e): Curing agent: melamine (CYMEL 303; manufactured by Cytec Inc.)
(f): Nonionic organic surfactant: p-octyl polyethylene glycol phenyl ether (X-100; manufactured by Triton Company)
(g): Ultraviolet absorber: N,N'-bisformyl-N,N'-bis-(2,2,6,6-tetramethyl-4-piperidinyl)-hexamethylendiamine (LS4050; manufactured by Sin Hun Chemical Company)
(h): Inorganic ultraviolet absorber: titanium dioxide (780T; manufactured by Tayca Corporation)

The conductive coating compositions formulated in Examples 1 to 8 were coated on a PET film (U48, manufactured by Toray Corporation, thickness: 100 μm, polyethylene terephthalate) by using an RDS coating rod #7 to a thickness of about 10 μm, and then dried at 130° C. for 3 minutes to obtain the conductive film of the present invention, where the thickness of the conductive layer was about 200 nm. Furthermore, the conductive coating compositions formulated in Example 9 and Example 10 were coated on glass (thickness: 0.5 mm, haze: 0.5%, a total light transmittance: 92.45%) by using an RDS coating bar #7 to a thickness of about 10 μm, and then dried at 130° C. for 3 minutes to obtain the conductive film of the present invention, where the thickness of the conductive layer was about 200 nm.

Test Method

Haze: the haze of the conductive film was measured by using an NDH 5000W haze meter (manufactured by Nippon Denshoku Industries Co., Ltd.).

Total light transmittance: the light transmittance of the conductive film was measured by using an NDH 5000W haze meter (manufactured by Nippon Denshoku Industries Co., Ltd.).

Surface resistivity: the surface resistivity after being cured was measured by using a LORESIA-GP MCP-T600 low impedance meter (manufactured by MITSUBISHI Chemical Corporation).

Adhesion: the surface of the coating film was scraped by using a Grid scraper, then a tape was affixed to the coating, and then the tape was torn off at an angle of 90 degrees, so as to determine the number of grids peeled off.

Alcohol resistance: the surface of the conductive layer of the conductive film was wiped by using 95% alcohol for 20 times, and the state of the surface was observed.

Test Result

The obtained test results are recorded in Table 2.

TABLE 2

| Composition | Haze (%) | Total Light Transmittance (%) | Surface Resistivity (Ω/sq) | Surface Resistivity after UV irradiation (Ω/sq) *1 | Liquid adhesive Adhesion | Alcohol resistance |
|---|---|---|---|---|---|---|
| Example 1 | 0.69 | 89.89 | 950 | — | No falling off | No abnormal |
| Example 2 | 0.61 | 89.65 | 741 | — | No falling off | No abnormal |
| Example 3 | 0.72 | 89.44 | 394 | — | No falling off | No abnormal |
| Example 4 | 0.70 | 87.6 | 310 | 410 | No falling off | No abnormal |
| Example 5 | 0.63 | 88.84 | 236 | — | No falling off | Slight failing off |
| Example 6 | 0.68 | 89.09 | 299 | — | No falling off | No abnormal |
| Example 7 | 0.92 | 88.1 | 260 | 260 | No falling off | No abnormal |
| Example 8 | 0.73 | 87.9 | 360 | 365 | No falling off | No abnormal |
| Example 9 | 0.37 | 88.4 | 358 | — | No falling off | No abnormal |
| Example 10 | 0.33 | 88.1 | 323 | — | No falling off | No abnormal |
| Comparative Example 1 | 0.76 | 90.11 | 1932 | — | No falling off | No abnormal |
| Comparative Example 2 | 0.70 | 87.47 | 203 | — | No falling off | Falling off |

*1: Irradiated with 365 nm UV 2000 mJ/$cm^2$.

It can be known from Table 2 that, the total light transmittance of the conductive film of the present invention after being dried and cured is greater than 85%, the surface resistivity is lower than 1000 Ω/sq, the conductive film has a good adhesion with the substrate and has a good alcohol resistance, which satisfy the requirements of the industry. As compared with Comparative Example 1, the conductive film of the present invention has a lower surface resistivity; and as compared with Comparative Example 2, the conductive film of the present invention has a better alcohol resistance, so a protective film needs not to be covered on the surface of the conductive layer of the conductive film.

Furthermore, in the present invention, an ultraviolet absorber may be optionally added (Example 7 and Example 8), to improve the UV resistance of the conductive film, so that the conductive film can maintain a good surface resistivity after ultraviolet irradiation.

What is claimed is:

1. A conductive coating composition, comprising:
    (a) a poly(3,4-ethylenedioxythiophene) derivative doped with a polyanion;
    (b) a non-conductive organic polymer, wherein the non-conductive organic polymer is selected from the group consisting of a polyester resin, an epoxy resin, a polyurethane resin, a silicone resin, a polyether polyol resin, a polyol resin and a combination thereof;
    (c) an aqueous solvent; and
    (d) optionally a curing agent;
    wherein the content of the poly(3,4-ethylenedioxythiophene) derivative doped with a polyanion is 25% to 50%, based on total weight of the solids content in the composition, and the weight-average molecular weight of the non-conductive organic compound polymer is in the range of 10,000 to 20,000.

2. The conductive coating composition according to claim 1, wherein the poly(3,4-ethylenedioxythiophene) derivative doped with a polyanion is selected from the group consisting of poly(3,4-ethylenedioxythiophene: polystyrene sulfonic acid (PEDOT: PSS)), poly(3,4-ethylenedioxythiophene: polyvinyl sulfonic acid (PEDOT: PVS)) and a combination thereof.

3. The conductive coating composition according to claim 1, wherein the content of the poly(3,4-ethylenedioxythiophene) derivative doped with a polyanion is 25 wt % to 45 wt %, based on the total weight of the solids content in the composition.

4. The conductive coating composition according to claim 1, wherein the curing agent is selected from the group consisting of a melamine curing agent, an isocyanate curing agent and an epoxy curing agent.

5. A conductive film, comprising a substrate, wherein at least one surface of the substrate has at least one conductive layer formed by the conductive coating composition according to claim 1; and the conductive film has a surface resistivity lower than 400 Ω/sq and a total light transmittance greater than 85%.

6. A conductive material comprising:
    (1) a substrate;
    (2) a conductive film formed on at least one surface of the substrate by a process comprising
        (a) coating the at least one surface with a composition comprising (i) a conductive organic polymer being a poly(3,4-ethylenedioxythiophene) derivative doped with a polyanion, (ii) a non-conductive organic polymer, wherein the non-conductive organic polymer is selected from the group consisting of a polyester resin, an epoxy resin, a polyurethane resin, a silicone resin, a polyether polyol resin, a polyol resin and a combination thereof, (iii) a curing agent and (iv) an aqueous solvent, and (b) drying the coating, wherein the content of the conductive organic polymer is 25% to 50%, based on a total weight of solids content in the composition, wherein the non-conductive organic compound is present in the composition in an amount effective to facilitate uniform dispersal of the conductive organic polymer in the composition and formation of the conductive film, and wherein the process is carried out to produce the conductive film with a total light transmittance of greater than 85% and a surface resistivity of no greater than 400 Ω/sq.

7. An anti-electromagnetic interference touch panel comprising:

a transparent substrate; and an anti-electromagnetic interference layer;

where the anti-electromagnetic interference layer is formed by laminating the conductive film according to claim 5 on the surface of the transparent substrate with an adhesion layer.

8. An anti-electromagnetic interference touch panel comprising:

a transparent substrate; and an anti-electromagnetic interference layer;

where the anti-electromagnetic interference layer is obtained by drying and curing the conductive coating composition according to claim 1.

\* \* \* \* \*